United States Patent
O'Dougherty et al.

(10) Patent No.: US 8,150,549 B2
(45) Date of Patent: *Apr. 3, 2012

(54) LIQUID HANDLING SYSTEM WITH ELECTRONIC INFORMATION STORAGE

(75) Inventors: Kevin T. O'Dougherty, Arden Hills, MN (US); Robert E. Andrews, Hudson, MA (US); Tripunithura V. Jayaraman, North Kingstown, RI (US); Joe Menning, Prior Lake, MN (US); Christopher A. Baye-Wallace, Anoka, MN (US)

(73) Assignee: Advanced Technology Materials, Inc., Danbury, CT (US)

( * ) Notice: Subject to any disclaimer, the term of this patent is extended or adjusted under 35 U.S.C. 154(b) by 21 days.

This patent is subject to a terminal disclaimer.

(21) Appl. No.: 12/707,449

(22) Filed: Feb. 17, 2010

(65) Prior Publication Data
US 2010/0152891 A1 Jun. 17, 2010

Related U.S. Application Data

(63) Continuation of application No. 10/742,125, filed on Dec. 19, 2003, now Pat. No. 7,702,418, which is a continuation-in-part of application No. 09/880,472, filed on Jun. 13, 2001, now Pat. No. 6,879,876, application No. 12/707,449, which is a continuation of application No. 10/139,104, filed on May 3, 2002, now Pat. No. 7,747,344, which is a continuation-in-part of application No. 09/880,472.

(51) Int. Cl.
*G06F 17/00* (2006.01)

(52) U.S. Cl. ........ 700/231; 700/239; 700/244; 700/265; 700/266; 700/281; 73/866.5

(58) Field of Classification Search ............... 700/105, 700/110, 230, 231, 239, 244, 265–273, 281–285; 73/866.5; 174/47; 137/177, 251.1, 798; 455/66; 324/637, 639, 663; 702/45–55; 340/618, 620, 572.1–572.9

See application file for complete search history.

(56) References Cited

U.S. PATENT DOCUMENTS
4,951,512 A 8/1990 Mazza et al.
(Continued)

FOREIGN PATENT DOCUMENTS
JP 2002-181296 A 6/2002
(Continued)

OTHER PUBLICATIONS

Lorefice, Bob, et al., "How to Minimize Resist Usage During Spin Coating", "Semiconductor International; found online Sep. 29, 2006 at http://www.reed-electronics.com/semiconductor/article/CA164074?pubdate=6%2F1%2F1998", Jun. 1, 1998.

(Continued)

*Primary Examiner* — Jeffrey A Shapiro
(74) *Attorney, Agent, or Firm* — Hultquist, PLLC; Steven Hultquist; Maggie Chappuis

(57) ABSTRACT

An electronic storage device is coupled with a container capable of holding liquid for electronically storing information relating to the liquid stored in the container. The system can be configured with an antenna, for storing information to and reading information from the electronic storage device. A microprocessor-based controller, coupled with the antenna, may be employed for controlling processing of the liquid based on information read from the electronic storage device by the antenna. A connector of a secure reader system having a reader is provided to physically couple to a container having an information storing mechanism, for periodically reading information from an information storing mechanism. The connector may draw material from the container simultaneous with the reading.

32 Claims, 10 Drawing Sheets

U.S. PATENT DOCUMENTS

| | | | |
|---|---|---|---|
| 5,014,208 A | 5/1991 | Wolfson | |
| 5,102,010 A | 4/1992 | Osgar et al. | |
| 5,223,796 A | 6/1993 | Waldman et al. | |
| 5,385,060 A | 1/1995 | Wang | |
| 5,524,794 A | 6/1996 | Benedetti, Jr. et al. | |
| 5,539,188 A | 7/1996 | Fallah et al. | |
| 5,558,083 A | 9/1996 | Bathe et al. | |
| 5,594,162 A | 1/1997 | Dolan et al. | |
| 5,604,681 A | 2/1997 | Koeninger | |
| 5,627,517 A | 5/1997 | Theimer et al. | |
| 5,635,652 A | 6/1997 | Beaudin | |
| 5,638,285 A | 6/1997 | Newton | |
| 5,651,402 A | 7/1997 | McCaul | |
| 5,737,221 A | 4/1998 | Newton | |
| 5,744,696 A | 4/1998 | Wang et al. | |
| 5,802,859 A | 9/1998 | Zugibe | |
| 5,803,673 A | 9/1998 | Reinsch et al. | |
| 5,852,590 A | 12/1998 | De la Huerga | |
| 5,875,921 A | 3/1999 | Osgar et al. | |
| 5,883,376 A | 3/1999 | Roesch et al. | |
| 5,893,263 A | 4/1999 | Matsumoto et al. | |
| 5,940,780 A | 8/1999 | Azar et al. | |
| 5,942,980 A | 8/1999 | Hoben et al. | |
| 5,949,049 A | 9/1999 | McCarrick et al. | |
| 5,953,682 A | 9/1999 | McCarrick et al. | |
| 5,955,684 A | 9/1999 | Gravel et al. | |
| 6,065,638 A | 5/2000 | Terranova et al. | |
| 6,067,844 A | 5/2000 | Westbrook et al. | |
| 6,140,146 A | 10/2000 | Brady et al. | |
| 6,147,662 A | 11/2000 | Grabau et al. | |
| 6,161,706 A | 12/2000 | Mc Cord | |
| 6,165,347 A | 12/2000 | Warburton | |
| 6,206,240 B1 | 3/2001 | Osgar et al. | |
| 6,209,592 B1 | 4/2001 | Gilboa et al. | |
| 6,234,006 B1 | 5/2001 | Sunshine et al. | |
| 6,271,753 B1 | 8/2001 | Shukla | |
| 6,275,746 B1 | 8/2001 | Leatherman et al. | |
| 6,281,787 B1 | 8/2001 | Lerg et al. | |
| 6,282,458 B1 | 8/2001 | Murayama et al. | |
| 6,318,568 B1 | 11/2001 | Mc Cord | |
| 6,347,723 B1 | 2/2002 | Barlian et al. | |
| 6,405,745 B1 | 6/2002 | Kar et al. | |
| 6,446,644 B1 | 9/2002 | Dolechek | |
| 6,516,249 B1 | 2/2003 | Hoyle et al. | |
| 6,524,774 B1 | 2/2003 | Sonderman | |
| 6,542,848 B1 | 4/2003 | Neeser et al. | |
| 6,545,592 B2 | 4/2003 | Weiner | |
| 6,556,027 B2 | 4/2003 | Banks | |
| 6,556,832 B1 | 4/2003 | Soliman | |
| 6,556,889 B2 | 4/2003 | Rudick et al. | |
| 6,556,949 B1 | 4/2003 | Lyon | |
| 6,558,620 B1 | 5/2003 | Sanford et al. | |
| 6,571,151 B1 | 5/2003 | Leatherman | |
| 6,592,043 B1 | 7/2003 | Britton | |
| 6,597,175 B1 | 7/2003 | Brisco | |
| 6,618,714 B1 | 9/2003 | Abrahams | |
| 6,633,796 B1 | 10/2003 | Pool et al. | |
| 6,642,897 B2 | 11/2003 | Forster et al. | |
| 6,649,829 B2 | 11/2003 | Garber et al. | |
| 6,672,341 B2 | 1/2004 | Bartholomew et al. | |
| 6,720,866 B1 | 4/2004 | Sorrells et al. | |
| 6,732,945 B2 | 5/2004 | Dolechek | |
| 6,843,414 B2 | 1/2005 | Madrid et al. | |
| 6,879,876 B2 * | 4/2005 | O'Dougherty et al. | 700/231 |
| 6,942,123 B2 | 9/2005 | Wertenberger | |
| 7,061,831 B2 | 6/2006 | De La Huerga | |
| 7,069,100 B2 | 6/2006 | Monette et al. | |
| 7,188,644 B2 | 3/2007 | Kelly et al. | |
| 7,316,329 B2 | 1/2008 | Wertenberger | |
| 7,664,568 B2 * | 2/2010 | O'Dougherty et al. | 700/231 |
| 7,702,418 B2 * | 4/2010 | O'Dougherty et al. | 700/231 |
| 7,747,344 B2 * | 6/2010 | O'Dougherty et al. | 700/231 |
| 7,760,104 B2 | 7/2010 | Asp et al. | |
| 2001/0052465 A1 | 12/2001 | Dordi et al. | |
| 2002/0078363 A1 | 6/2002 | Hill et al. | |
| 2003/0004608 A1 | 1/2003 | O'Dougherty et al. | |
| 2003/0205285 A1 | 11/2003 | Kelly et al. | |
| 2003/0205581 A1 | 11/2003 | Wertenberger | |
| 2004/0058453 A1 | 3/2004 | Free et al. | |
| 2005/0177274 A1 | 8/2005 | O'Dougherty et al. | |

FOREIGN PATENT DOCUMENTS

| | | |
|---|---|---|
| JP | 2003-139864 A | 5/2003 |
| WO | 00/54724 A2 | 9/2000 |

OTHER PUBLICATIONS

Phillips Semiconductors, "Controllers for high security, crypto and dual interface smart cards", Mar. 1999, Publisher: Phillips Electronics.

Phillips Semiconductors, "MIFARE System Overview", Feb. 1998, Publisher: Phillips Electronics NV.

* cited by examiner

LIQUID HANDLING SYSTEM WITH ELECTRONIC INFORMATION STORAGE

CROSS REFERENCE TO RELATED APPLICATIONS

This application is a continuation of U.S. patent application Ser. No. 10/742,125 filed on Dec. 19, 2003 and subsequently issued as U.S. Pat. No. 7,702,418, which application is a continuation-in-part of U.S. patent application Ser. No. 09/880,472 filed on Jun. 13, 2001 and subsequently issued as U.S. Pat. No. 6,879,876. This application is also a continuation of U.S. patent application Ser. No. 10/139,104 filed on May 3, 2002 now U.S. Pat. No. 7,747,344 and published as U.S. Patent Application Publication No. 2003/0004608, which application is a continuation-in-part of U.S. patent application Ser. No. 09/880,472 filed on Jun. 13, 2001 and subsequently issued as U.S. Pat. No. 6,379,876. The disclosures of all of the foregoing applications, publications, and patent are hereby incorporated by reference herein in their respective entireties, for all purposes, and the priority of all such applications is hereby claimed under the provisions of 35 U.S.C. §120.

FIELD OF THE INVENTION

This invention relates to a storage and dispensing system for the storage and dispensing of liquids. In particular, the invention relates to using a radio frequency identification tag and a radio frequency antenna to assure proper association of a particular liquid to a particular process. Embodiments described relate to reader or tracking systems. In particular, embodiments relate to reader systems employing features to ensure secure and proper readings. Embodiments may also relate to features that account for changes in characteristics from one item being read or tracked to another.

BACKGROUND OF THE INVENTION

Certain manufacturing processes require the use of liquid chemicals such as acids, solvents, bases, photoresists, CMP slurries, dopants, inorganic, organic and biological solutions, pharmaceuticals, and radioactive chemicals. Often, these processes require a specific liquid chemical for each particular process. Furthermore, each process may require a specific liquid chemical at various stages of the process. Storage and dispensing systems in many instances are arranged to allow alternative containers to be used to deliver liquid chemicals to a manufacturing process at a specified time. Consequently, manufacturing personnel need to change the liquid chemical being used for the particular process at the specified time so that the system delivers the correct liquid chemical to the manufacturing process. It is critical that the proper liquid chemical be installed into the systems for the particular process. If the incorrect liquid chemical is installed for a particular process, personnel may be put at risk. Furthermore, equipment and the articles under manufacture may be severely damaged or even rendered useless for their intended functions.

Prior art systems have attempted to utilize unique pump connectors that will only fit with a correct container. Each container has a unique configuration based on the liquid chemical contained therein. The intention is that only the correct chemical can be used in any particular manufacturing process, because the process will dictate a unique pump connection and a corresponding container with the correct chemical liquid. One example of such a system is disclosed in Osgar et al., "Liquid Chemical Dispensing System With Sensor," U.S. Pat. No. 5,875,921. The Osgar system uses physical configurations, called key codes, to prevent accidental dispensing of an improper liquid from a container. Both the container and a connector have unique key code configurations. The connector must have the same key code configuration as the container for the connector to be properly coupled with the container. The Osgar system also employs a sensor that senses proper coupling of the connector to the container. When the sensor senses a proper coupling of the connector to the container, a pump is enabled. When the container and the connector are not properly coupled, the pump is disabled.

Some prior art systems, however, do allow the pump connectors to be partially connected to the incorrect chemicals such that pumping can take place even though the connection is not proper. In addition, personnel still can attach the wrong chemical to the wrong process or at the wrong time. Such incorrect connections can be dangerous to personnel and have caused millions of dollars of damage to equipment and to articles of manufacture. A system that provides a reliable connection between the correct chemical and the correct process, and enables tracking of incorrect connection attempts by personnel would be a useful improvement over the prior systems.

In the fabrication of semiconductor devices, materials of varying purposes are deposited on a semiconductor substrate. The semiconductor substrate is often a wafer of monocrystalline silicon materials such as silicon dioxide. Materials deposited thereon may include copper, aluminum and other metals to form metal lines or other circuit features within trenches of the semiconductor substrate. Additional circuit features and material layers may be formed on the semiconductor substrate throughout the fabrication process.

In order to form trenches as described above, a photoresist material is first deposited above the semiconductor substrate. The manner of transport and delivery of the photoresist material to the semiconductor substrate may be critical to the fabrication process. For example, the cost of application of the wrong type of photoresist may be quite extreme. Such an error may cost in terms of a destroyed expensive semiconductor substrate, such as a circuit device wafer, wasted photoresist, and the downtime necessary to correct the error.

The photoresist material described above is transported and delivered to the surface of the semiconductor substrate in a liquid form. The photoresist material is applied and thinly spread across the semiconductor substrate surface generally by a spin-on process. Parameters of the spin-on process are selected to ensure a fairly uniform, thin distribution of the photoresist across the surface of the semiconductor substrate. This is often followed by application of heat to the semiconductor substrate resulting in the formation of a solid photoresist layer on the semiconductor substrate.

The solid photoresist layer described above may be patterned to allow for the formation of trenches therebelow by conventional etching techniques. However, proper trench formation and uniformity is dependent in part upon the degree of uniformity displayed by the thin photoresist layer defining the trenches. Indeed, proper transport and delivery of photoresist material to the semiconductor substrate is critical to the fabrication of a reliable semiconductor device. In fact, as device features, such as metal lines, become smaller and smaller, the adverse effect of photoresist non-uniformity on a device feature becomes magnified.

Achieving a uniformly thin photoresist layer may require application of a spin-on, or other process, which employs parameters based on the particular physical and functional characteristics of the photoresist material. Unfortunately, characteristics of a photoresist material type may vary from one batch to the next. For example, the viscosity of a photoresist type may vary from one batch or container to the next. Thus, establishing reliable predetermined parameters for forming an adequately uniform photoresist layer on a semiconductor substrate may be extremely difficult, if not impossible, to accomplish. Proper transport and application of photoresist material to the semiconductor substrate faces challenges related to both providing the proper type of photoresist material, and employment of the proper application parameters in light of precise characteristics of the photoresist material provided.

SUMMARY OF THE INVENTION

In various embodiments, the present invention provides systems for handling liquid and methods for the same. Systems according to the present invention substantially eliminates or reduces disadvantages and problems associated with previously developed storage and dispensing systems by using a radio frequency identification tag and a radio frequency antenna to assure proper association of a particular liquid to a particular process. The system in one embodiment includes a container capable of holding a liquid. A storage means is coupled with the container for electronically storing information relating to the liquid stored in the container. The system also includes a communication means, for storing information to and reading information from the storage means. The system includes a controller means, coupled with the communication means, for controlling processing of the liquid based on information read from the storage means by the communication means.

In one embodiment, a cap is also coupled with the opening such that the liquid is sealed in the container. A radio frequency identification (RFID) tag is mounted on the cap which is capable of electronically storing information. The RFID tag comprises a passive RF transponder and an electrically erasable programmable read-only memory (EEPROM). A connector is coupled with the cap such that the liquid can be dispensed from the container through the connector. A radio frequency (RF) antenna is mounted on the connector which stores information to and reads information from the EEPROM on the RFID tag. A microprocessor-based controller is coupled with the RF antenna such that the controller controls processing the liquid from the container based on information read from the RFID tag by the RF antenna.

In one embodiment, the connector further comprises a connector head and a probe extending from the connector head. The probe is insertable through a center of the cap and into the opening. The probe has a flow passage. A pump is coupled with the probe and with the flow passage for pumping liquid through the probe and the flow passage.

Other embodiments, aspects and features of the invention will be more fully apparent from the ensuing disclosure and appended claims.

DETAILED DESCRIPTION OF THE INVENTION, AND PREFERRED EMBODIMENTS THEREOF

Figure 1:
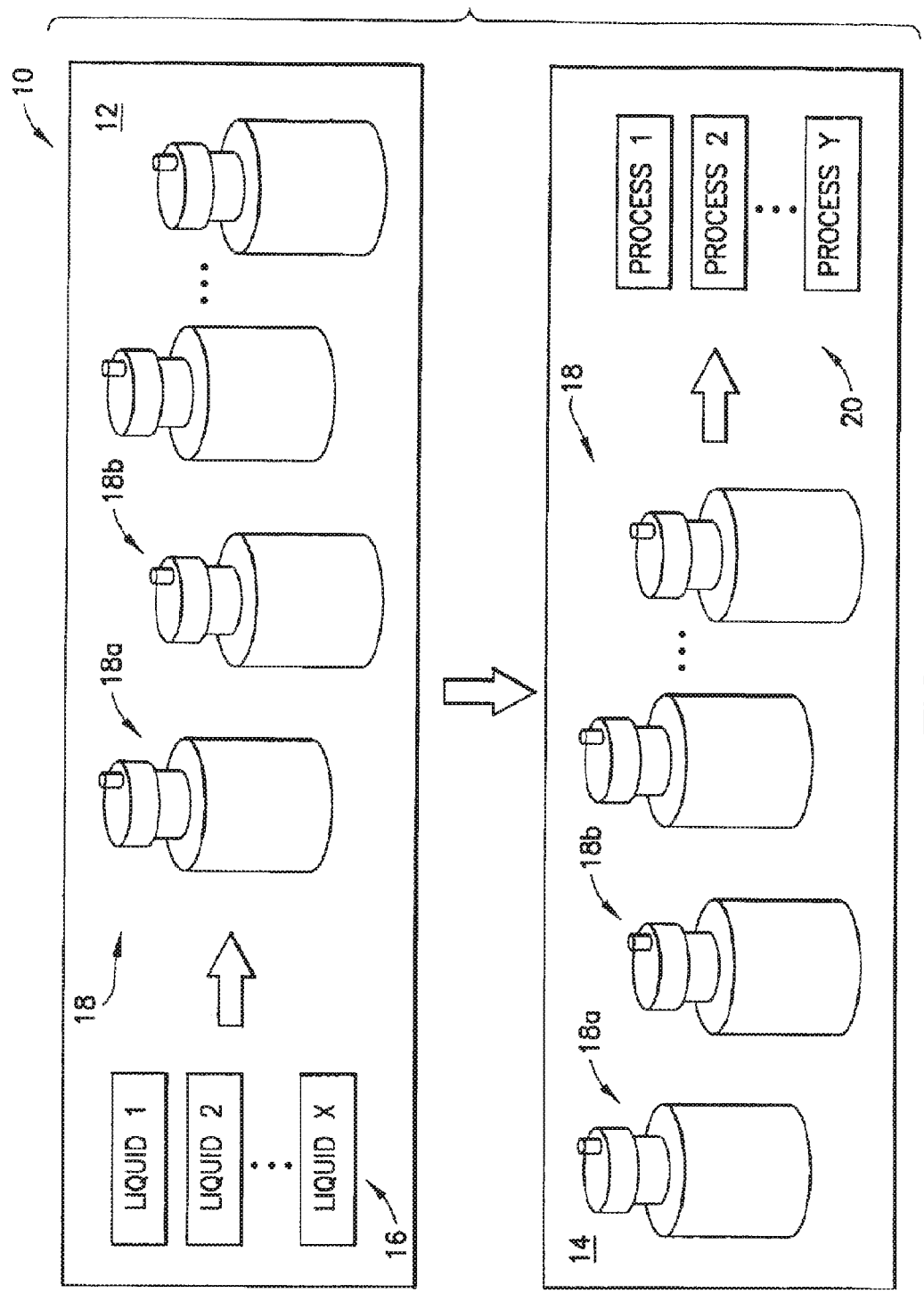
FIG. 1 shows a system for storing, dispensing and processing liquids in accordance with the present invention.

FIG. 1 shows system 10 for storing, dispensing and processing liquids in accordance with the present invention. System 10 includes filling system 12 and processing system 14.

Filling system 12 includes a plurality of liquids 16 and containers 18. In operation of filling system 12, liquids 16 are dispensed into containers 18. Liquids 16 are typically liquid chemicals including acids; solvents; bases; photoresists; dopants; inorganic, organic, and biological solutions; pharmaceuticals; and radioactive chemicals. Filling system 12 tracks which of liquids 16 is placed into which containers 18 so that liquids 16 in containers 18 can be identified later, as will be discussed more fully below. After filling of containers 18 has been completed, containers 18 are transported to processing system 14.

Processing system 14 includes a plurality of containers 18 and processes 20. In operation of processing system 14, liquids 16 contained in containers 18 are used in processes 20. For example, containers 18 may contain a liquid chemical such as photoresist for use in the manufacturing of integrated circuits. Processing system 14 reads containers 18 to determine which liquids 16 are contained within them so that the proper liquid 16 is used in the proper process 20, as will be discussed more fully below.

Figure 2:
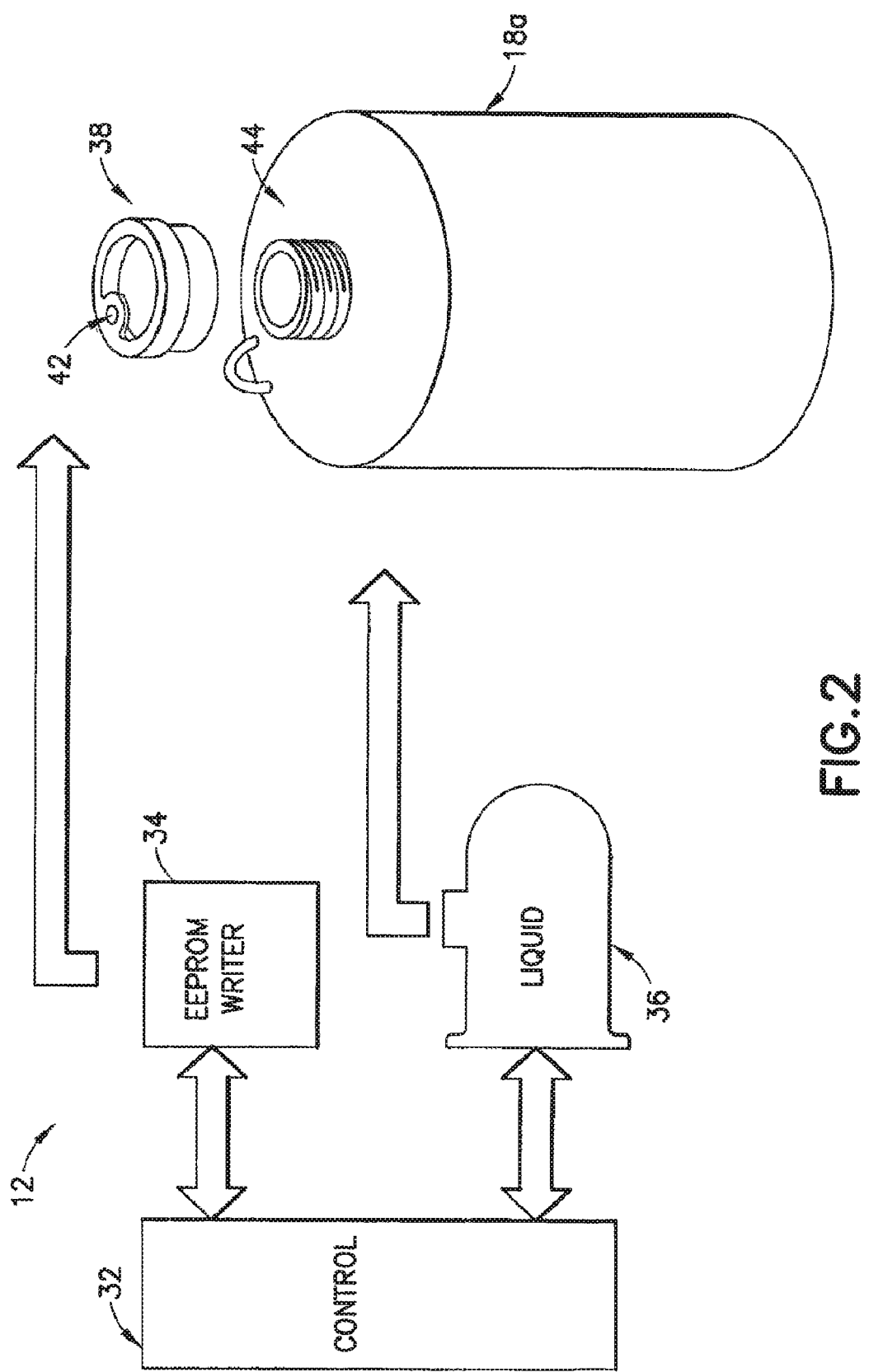
FIG. 2 shows a filling system for filling a container with liquid.

FIG. 2 shows filling system 12 for filling a container with liquid. Filling system 12 includes microprocessor-based control unit 32, electrically erasable programmable read-only memory (EEPROM) writer 34, liquid reservoir 36, cap 38, and container 18a. Control unit 32 is electrically connected to EEPROM writer 34 and liquid reservoir 36. Liquid reservoir 36 is connected to container 18a. Cap 38 includes radio frequency identification (RFID) tag 42. RFID tag 42 includes an EEPROM and a passive radio frequency transponder. EEPROM writer 34 is capable of writing to RFID tag 42 on cap 38.

In operation of filling system 12, control unit 32 regulates dispensing of liquid from liquid reservoir 36 into container 18a. Typically, filling system 12 includes a plurality of liquid reservoirs 36 connected to control unit 32. That is, control unit 32 typically regulates dispensing of a plurality of liquids into a plurality of containers 18. For ease of illustration, a single liquid reservoir 36 and a single container 18a are shown. To begin operation of filling system 12, control unit 32 sends a signal to liquid reservoir 36 instructing liquid reservoir 36 to begin dispensing liquid into container 18a. Liquid reservoir 36 continues dispensing liquid into container 18a until container 18a is filled to an appropriate level. After container 18a is filled, liquid reservoir 36 sends a signal to control unit 32 indicating container 18a is full. Control unit 32 then sends a signal to liquid reservoir 36 to stop dispensing liquid into container 18a.

After container 18a is filled, control unit 32 sends a signal to EEPROM writer 34. This signal contains information about liquid contained in liquid reservoir 36. EEPROM writer 34 subsequently programs the EEPROM contained in RFID tag 42 with information received from control unit 32 in a process known to the art. Information programmed to the RFID tag 42 includes, for example, the type of liquid dispensed into container 18a from liquid reservoir 36, the producer of the liquid contained in liquid reservoir 36, the date of filling of container 18a with liquid from liquid reservoir 36, the date of expiration of the liquid contained in container 18a, and similar useful information. Once container 18a has been filled and RFID tag 42 has been programmed by EEPROM writer 34, cap 38 is secured onto container opening 44 of container 18a. In a preferred embodiment, cap 38 is threadably connected to container opening 44 of container 18. Cap 38 may also be secured onto container opening 44 by, for example, snapping cap 38 onto container opening 44 or vacuum sealing cap 38 onto container opening 44. The method of securing cap 38 onto container opening 44 depends on the properties of the liquid contained in container 18a. After cap 38 has been secured onto container 18a, container 18a is transported to a processing system.

Figure 3:
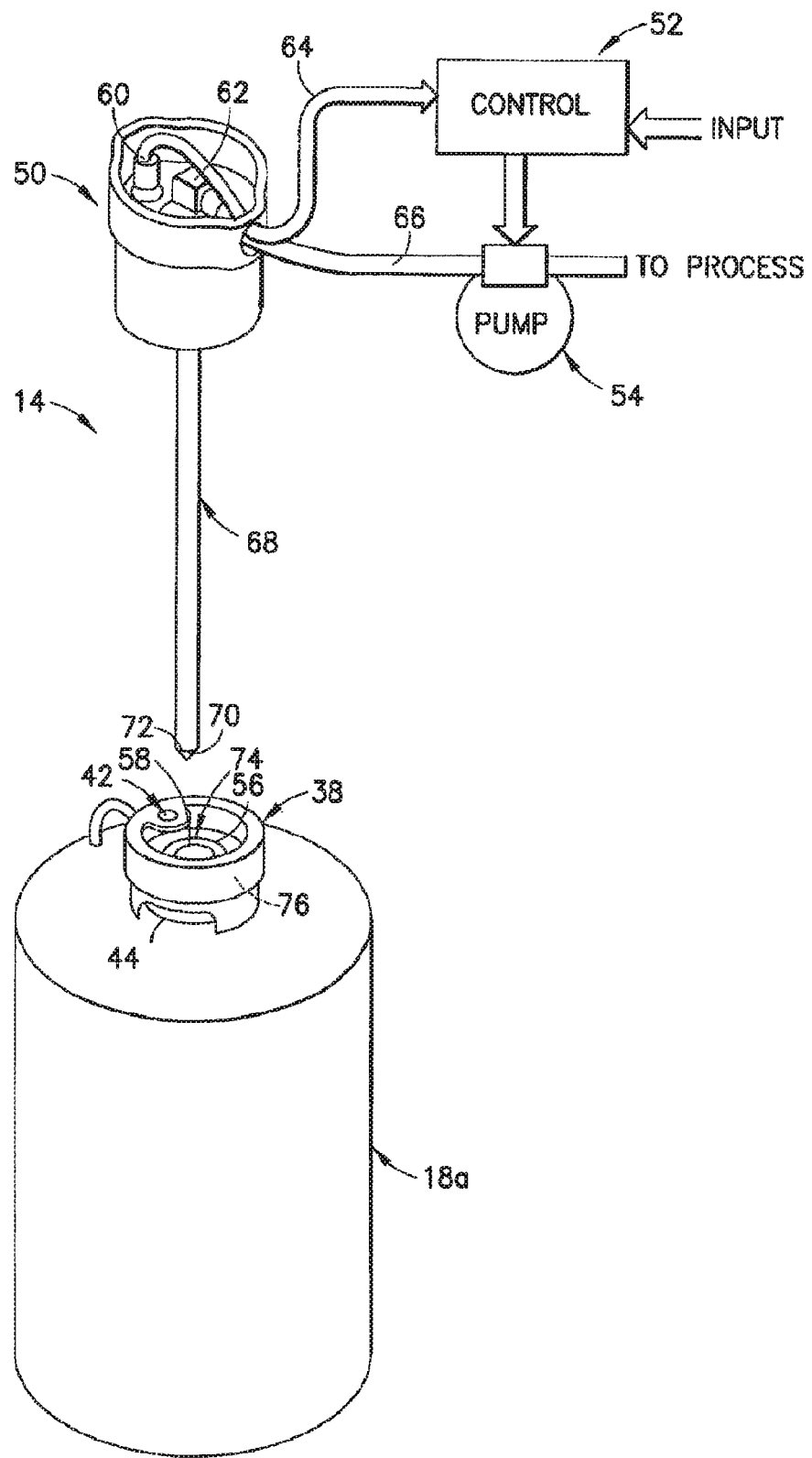
FIG. 3 shows a preferred embodiment of a processing system for dispensing and processing liquid.

FIG. 3 shows a preferred embodiment of processing system 14. Processing system 14 includes cap 38, container 18a, connector 50, control unit 52, and pump 54. Container 18a includes container opening 44. Cap 38 includes RFID tag 42, rupturable membrane 56, and membrane scores 58. Connector 50 includes radio frequency (RF) antenna 60, port adapter 62, modular antenna line 64, adapter tube 66, and probe 68. Probe 68 includes lower probe port 70 located adjacent probe tip 72. In a preferred embodiment, cap 38 is threadably connected to container opening 44 of container 18a. After container 18a with cap 38 are transported to the desired location, probe hole 74 and vent hole 76 are exposed. Rupturable membrane 56 is exposed through probe hole 74. Rupturable membrane 56 has membrane scores 58 in its surface. Connector 50 is configured to be interconnected with cap 38.

FIG. 3 shows how the components of processing system 14 are assembled. More specifically, connector 50 is shown being interconnected with cap 38 and container 18a. Probe tip 72 is inserted through probe hole 74 and pressed against rupturable membrane 56 proximate to membrane scores 58. When sufficient pressure is applied on connector 50 toward rupturable membrane 56, probe tip 72 ruptures rupturable membrane 56 along membrane scores 58 allowing probe 68 to be inserted through membrane 56. Continued pressure on connector 50 then allows connector 50 to be moved immediately adjacent cap 38. Probe 68 is then in communication with the interior of container 18a. As such, connector 50 is mounted on container 18a. Adapter tube 66 and port adapter 62 provide a liquid passage from the interior of container 18a to pump 54. When processing system 14 is properly assembled, pump 54 is capable of pumping the liquid in container 18a through port adapter 62 and adapter tube 66 to a manufacturing process, such as the manufacturing of integrated circuits. Typically, processing system 14 includes a plurality of containers 18, a plurality of connectors 50, and a plurality of pumps 54 connected to control unit 52. That is, control unit 52 typically regulates dispensing of liquid from a plurality of containers 18 to a plurality of processes via a plurality of pumps 54. For ease of illustration, a single connector 50, a single container 18a, and a single pump 54 are shown.

The operation of pump 54 is controlled by control unit 52. Control unit 52 may receive input from an operator relating to starting and stopping pump 54. For example, an operator seeking to start pumping the liquid chemical in container 18a to a manufacturing process may input this information to control unit 52.

Control unit 52, however, is also configured to receive signals from RF antenna 60 via either modular antenna line 64 or RF transmissions. In operation of processing system 14, control unit 52 receives input from a process indicating a liquid needed by the process. For example, in the manufacture of integrated circuits, a layer of photoresist may be needed. Control unit 52 sends a signal to RF antenna 60. Probe 68 of connector 50 is then inserted through probe hole 74 until connector 50 is immediately adjacent to cap 38. Connector 50 is positioned such that RF antenna 60 is located adjacent RFID tag 42. A signal requesting the information stored in the EEPROM of RFID tag 42 is then transmitted from RF antenna 60 to RFID tag 42. The signal is received by the passive RF transponder contained in RFID tag 42. The signal received by the transponder activates RFID tag 42. Subsequently, information stored on the EEPROM contained in RFID tag 42 is read from the EEPROM to the transponder. The transponder then transmits the information contained on the EEPROM to RF antenna 60. RF antenna 60 sends the information received from RFID tag 42 to control unit 52 via modular antenna line 64 or via a RF transmission. Control unit 52 compares information received from RF antenna 60 to information about the liquid needed by the process, and controls pump 54 accordingly. That is, if container 18a contains an undesired or unexpected liquid, control unit 52 will disable pump 54. Conversely, if container 18 contains an expected and desired liquid, control unit 52 will enable pump 54.

Consequently, when processing system 14 is not properly assembled and an operator, believing that processing system 14 is properly assembled, inputs information to start pump 54, pump 54 will not operate. In this way, processing system 14 prevents the accidental operation of an improperly assembled system. This will prevent delivery of an improper liquid to a process.

Figure 4:
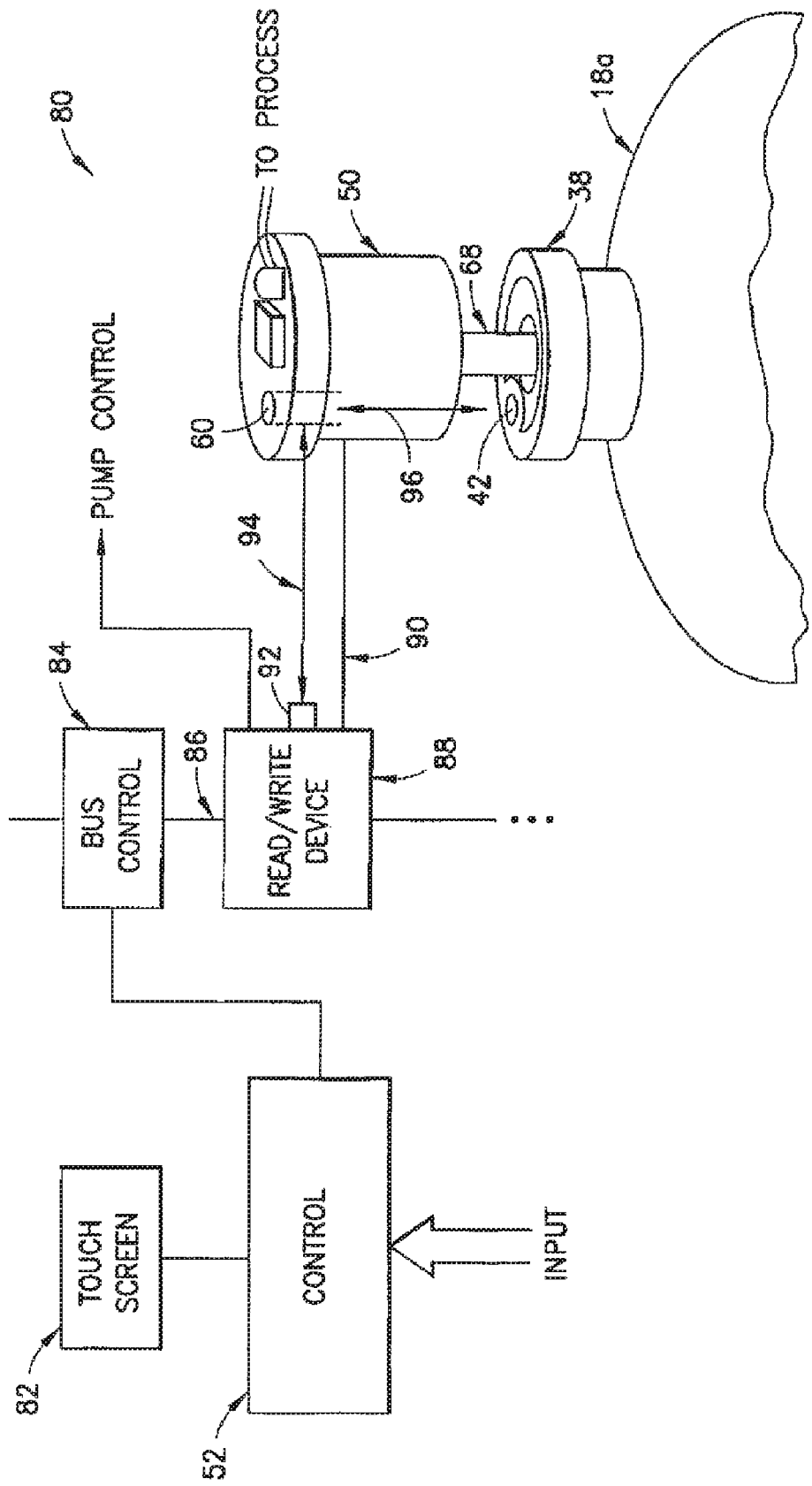
FIG. 4 shows a user-interface in the processing system for dispensing and processing liquid shown in FIG. 3.

FIG. 4 shows a preferred embodiment of user-interface 80 in processing system 14 for dispensing and processing liquid shown in FIG. 3. User interface 80 includes touch screen 82, microprocessor-based control unit 52, bus control unit 84, communication bus 86, read/write devices 88, connector 50, cap 38, and container 18a. Touch screen 82 is connected to control unit 52. Control unit 52 is connected to bus control unit 84, typically via an Ethernet or other serial communications cable. Control unit 52 also receives input from a process. Bus control unit 84 is connected to read/write device 88 via communication bus 86. Read/write device 88 is connected to connector 50 via modular antenna line 90. Read/write device 88 may also communicate with connector 50 through remote antenna 92. Connector 50 communicates with RFID tag 42 on cap 38 via RF antenna 60 using radio frequency transmissions.

For simplicity of illustration, FIG. 4 shows a single connector 50 connected to communication bus 86 through read/write device 88. In a typical system, a plurality of read/write devices 88 are connected to communication bus 86, each read/write device 88 connected to different connectors 50 coupled with containers 18 containing different liquids. Containers 18 are typically situated in a plurality of drawers, each drawer containing a plurality of positions. Each position is configured to hold one container 18. In operation of user-interface 80, each of containers 18 is graphically displayed on touch screen 82 in its corresponding drawer and position within the drawer. For example, in a system having two drawers and four positions within each drawer, container 18a positioned in the second position of the first drawer is graphically displayed on touch screen 82 in the second position of the first drawer. When connector 50 is matched properly with container 18a (as described above), the graphic representation of container 18a on touch screen 82 is displayed in a first color, typically green. This indicates to an operator that the liquid contained in container 18a is ready for dispensing to a process. Conversely, if connector 50 is matched improperly with container 18a (as described above), the graphic representation of container 18a on touch screen 82 is displayed in a second color, typically red, and a warning message appears on touch screen 82. This indicates to the operator that the liquid contained in container 18a will not dispense to a process until the mismatch is corrected.

When container 18a needs to be replaced (for example, when container 18 is empty), the operator removes container 18a from its position. Touch screen 82 then graphically displays container 18a, along with the drawer number and position number of container 18a. The operator then exchanges container 18a for new container 18b, and couples connector 50 with new container 18b. If connector 50 is matched properly with new container 18b (as described above), all containers 18 are displayed on touch screen 82 in the first color. If connector 50 is matched improperly with new container 18b (as described above), new container 18b is displayed on touch screen 82 in the second color and a warning message appears on touch screen 82.

Touch screen 82 also allows the operator to choose from a variety of operations using RFID tag 42. Each operation is selectable from a button on touch screen 82 which corresponds to each operation. For example, an operator may view information stored on RFID tag 42 about liquid contained in containers 18, record information to RFID tag 42 about liquid in containers 18 (such as when the liquid is installed into its proper drawer and position, the shelf life of the liquid, what process the liquid is used in, when the liquid is used in a process, how much of the liquid is used in a process, etc.), or enable probe 68 for dispensing liquid from containers 18. The operator touches the button on touch screen 82 corresponding to a desired operation. Touch screen 82 sends the selection made by the operator to control unit 52. Control unit 52 subsequently commands bus control unit 84 to perform the selected operation. The selected operation is performed, and the result is displayed on touch screen 82.

As an example, the operator may desire to view information stored on RFID tag 42 about liquid in container 18a. The operator first pushes the button on touch screen 82 corresponding to this operation. Touch screen 82 sends this selection to control unit 52. Control unit 52 then commands bus control unit 84 to access RFID tag 42 on container 18a. To access RFID tag 42, bus control unit 84 sends a signal along communication bus 86 to the read/write device accessing RFID tag 42: read/write device 88. Read/write device 88 then accesses RF antenna 60, either via modular antenna line 90 or a RF transmission via antenna 92. In this preferred embodiment, separation 94 between antenna 92 and RF antenna 60 is typically less than five meters for successful RF communication. Next, RF antenna 60 transmits a signal to RFID tag 42. In this preferred embodiment, separation 96 between RF antenna 60 and RFID tag 42 is typically less than ten millimeters for successful RF communication. The signal is received by the passive RF transponder contained in RFID tag 42. The signal activates RFID tag 42 and the requested information is accessed from the EEPROM contained on RFID tag 42. The requested information is then read from the EEPROM by the transponder, and the transponder transmits the information back to RF antenna 60. RF antenna 60 then sends the information to read/write device 88 either via modular antenna line 90 or via RF transmissions to antenna 92. The information is sent along communication bus 86 to bus control unit 84, which in turn sends the information to control unit 52. Once received by control unit 52, information about the liquid in container 18a is displayed on touch screen 82.

The liquid dispensing system of the present invention prevents the accidental operation of an improperly assembled system by storing liquid in a container having a cap with a radio frequency identification tag containing electrically erasable programmable read-only memory. (EEPROM). The EEPROM stores information about the liquid contained in the container. In a processing system, the information contained on the EEPROM can be accessed to prevent the accidental dispensing of an improper liquid and to maintain a database of the liquids used in a process. Also, additional information about the liquid can be written to the EEPROM in the processing system, such as when the liquid is used in a process and how much of the liquid is used in a process. Furthermore, the present invention allows for a standardization of the cap, container, and connector, since the control system now responds to information read from the cap rather than upon sensing a physical connection. This allows for a reduction in the amount of hardware that was necessary to accommodate the physical connectability safety feature of prior art systems.

Although the present invention has been described with reference to preferred embodiments, workers skilled in the art will recognize that changes may be made in form and detail without departing from the spirit and scope of the invention. For example, other forms of electronic storage may be used on RFID tag 42, such as erasable programmable read-only memory (EPROM), programmable read-only memory (PROM), and random-access memory (RAM). Also, the components of processing system 14 which communicate using radio frequencies may be configured to communicate using other areas of the electromagnetic spectrum, such as those in the areas of cellular or infrared communications.

Additional features and functions can be incorporated into the present invention, expanding the system capabilities of the present invention. These features and functions include, but are not limited, to Inventory Management. Such an inventory management module may be internal to the use of the present invention in an enterprise-wide network or may be integrated into existing Inventory Management software systems that are in place in individual processing facilities. Such a module could be utilized anywhere from the receiving dock to the empty container disposal center. Inventory management is implementable in a manner that allow users to track material usage, update inventory records, and provide a means of communicating (either automatically or by prompt) when a material needs to be re-ordered via the Internet or other communication tool.

Additionally, these features and functions may include the integration of container sensing input signals that would be processed to send control signal outputs to the tool. The inputs may come from the probe itself or from an external sensing system. Such sensing may include level sensing, temperature sensing or direct sensing of other material properties of the product in the container. This data may be cumulatively compiled to create a history of a container and its contents.

These features and functions may also include the communication of chemical data from the RFID tag directly to the tool itself, thereby providing another level of security and avoiding operator error. Information communicated by the RFID tag could be used to control track functions such as film thickness, spin speed, etc.

Features and advantages of the invention are more fully shown with respect to the following example, which is not to be limitingly construed, as regards to the character and scope of the present invention, but is intended merely to illustrate a specific preferred aspect useful in the broad practice of the present invention.

EXAMPLE 1

From the same lot of Oxide Slurry OS-70KL material (ATMI Materials Lifecycle Solutions, Danbury, Conn.) several different sample vials were made up, containing the OS-70KL material, to simulate behavior of the liquid in a bag in a drum container of the type generally shown and described herein and in U.S. Pat. Nos. 7,188,644 and 6,698,619 incorporated by reference herein in their entireties, with varying headspace in the interior volume of the liner.

The sample vials were made up with the following differing headspace levels: 0%, 2%, 5% and 10%. Each of the sample vials was vigorously shaken for one minute by hand, and the liquid in the vial was then subjected to analysis in an Accusizer 780 Single Particle Optical Sizer, a size range particle counter commercially available from Sci-Tec Inc. (Santa Barbara, Calif.), which obtains particle counts in particle size ranges that can then be "binned" algorithmically into broad particle distributions.

The data obtained in this experiment are shown in Table 1 below. The particle counts are shown for each of the particle sizes 0.57 µm, 0.98 µm, 1.98 µm and 9.99 µm, at the various headspace percentage values of 0%, 2%, 5% and 10% headspace volume (expressed as a percentage of the total interior volume occupied by the air volume above the liquid constituting the headspace void volume).

TABLE 1

Size Range Particle Counts for Varying Headspace Volumes in Sample Vials

| Average Particle Size for Range | Initial Particle Count Before Shaking | Particle Count—0% Headspace | Particle Count—2% Headspace | Particle Count—5% Headspace | Particle Count—10% Headspace |
|---|---|---|---|---|---|
| Size Range Particle Counts Immediately After Shaking Vial for One Minute | | | | | |
| 0.57 µm | 170,617 | 609,991 | 134,582 | 144,703 | 159,082 |
| 0.98 µm | 13,726 | 14,836 | 22,096 | 20,294 | 26,429 |
| 1.98 µm | 2,704 | 2,900 | 5,298 | 4,397 | 6,293 |
| 9.98 µm | 296 | 321 | 469 | 453 | 529 |
| Size Range Particle Counts 24 Hours After Shaking Vial for One Minute | | | | | |
| 0.57 µm | 110,771 | 1,198,296 | 191,188 | 186,847 | 182,217 |
| 0.98 µm | 11,720 | 18,137 | 21,349 | 20,296 | 24,472 |
| 1.98 µm | 2,701 | 2,383 | 4,658 | 4,272 | 5,704 |
| 9.98 µm | 138 | 273 | 544 | 736 | 571 |

The particle size analyzer presented the data in terms of large-size particle counts, in units of particles per milliliter>a specific particle size in micrometers (µm). The particle count data has been determined to provide a direct correlation between the magnitude of the particle count and wafer defectivity when the reagent containing such particle concentration is employed for manufacturing microelectronic devices on semiconductor wafers.

The data taken immediately after the shaking experiment show some trending toward larger particle counts with increasing headspace values, particularly for particles>0.98 µm. Data taken 24 hours later show the same trending toward higher particle distributions.

The data show that increasing headspace in the vial produced increasing aggregations of large size particles, which are deleterious in semiconductor manufacturing applications and can ruin integrated circuitry or render devices formed on the wafer grossly deficient for their intended purpose.

As applied to bag in a drum containers of the type shown and described herein and in U.S. Pat. Nos. 7,188,644 and 6,698,619 (which are incorporated by reference herein in their respective entireties), the results of this Example indicate the value of the preferred zero headspace arrangement. Any significant headspace in the container holding high purity liquid, combined with movement of the container incident to its transport, producing corresponding movement, e.g., sloshing, of the contained liquid, will produce undesirable particle concentrations. Therefore, to minimize the formation of particles in the contained liquid, the headspace should be correspondingly minimized to as close to a zero headspace condition as possible.

Embodiments are described below with reference to certain features of a secure reader system. In particular, features are described which help to ensure the reliability and security of a container assembly containing a photoresist material. Additionally, features are described which allow for seamless calibration of application parameters to ensure that any change in characteristics of a photoresist material type are accounted for when changing from one batch or container of photoresist material to the next.

Figure 5:
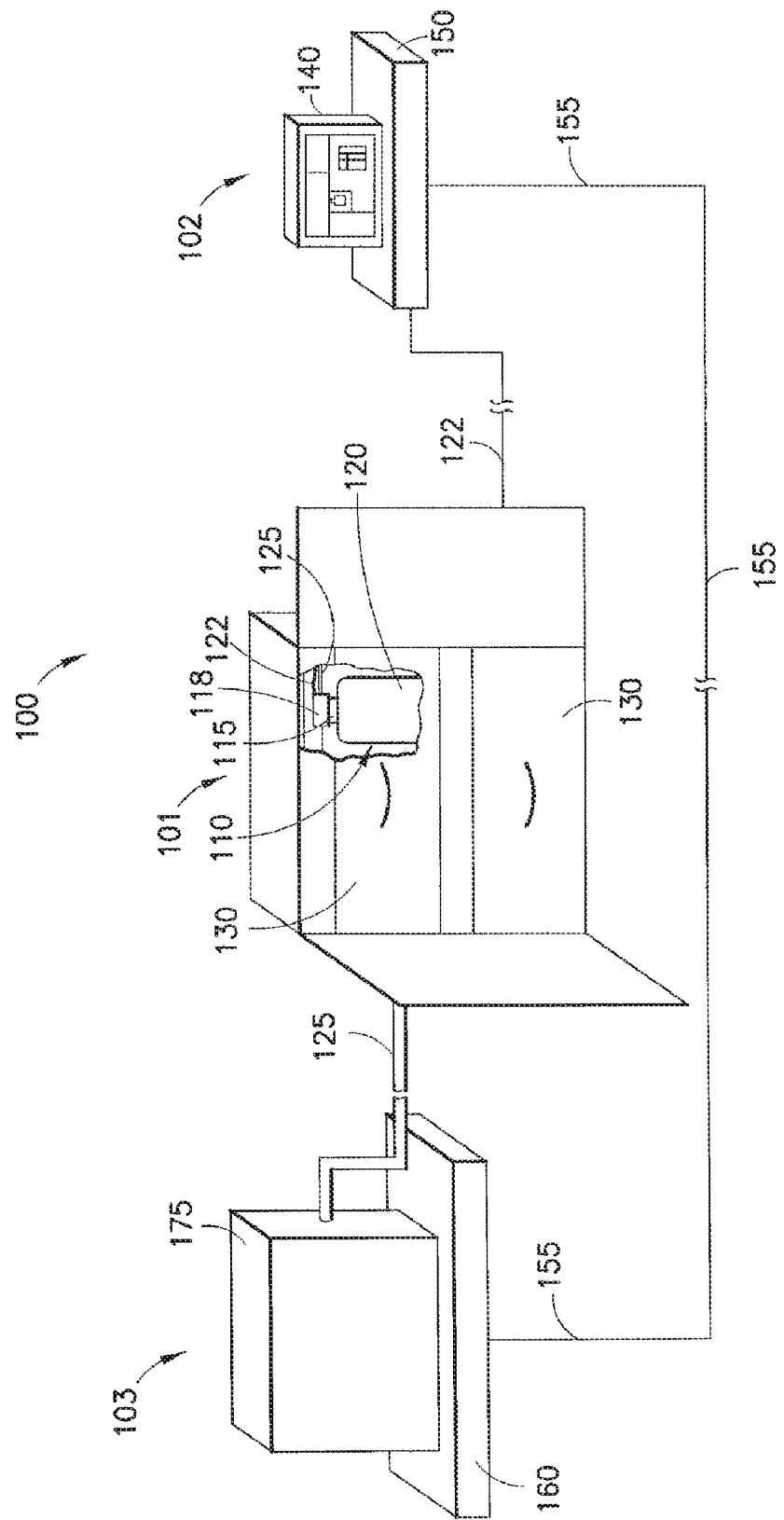
FIG. 5 is a sectional perspective view of an embodiment of a reader system.

Referring now to FIG. 5, an embodiment of a secure reader system (SRS) 100 is shown. The SRS 100 includes a material cabinet 101 for housing a container assembly 110. In the embodiment shown, only one container assembly 110 is visible. However, a plurality of container assemblies 110 may be included. Additionally, the material cabinet 101 may have multiple material drawers 130 as shown, to increase the number and types of container assemblies 110 which may be accommodated.

Figure 6:
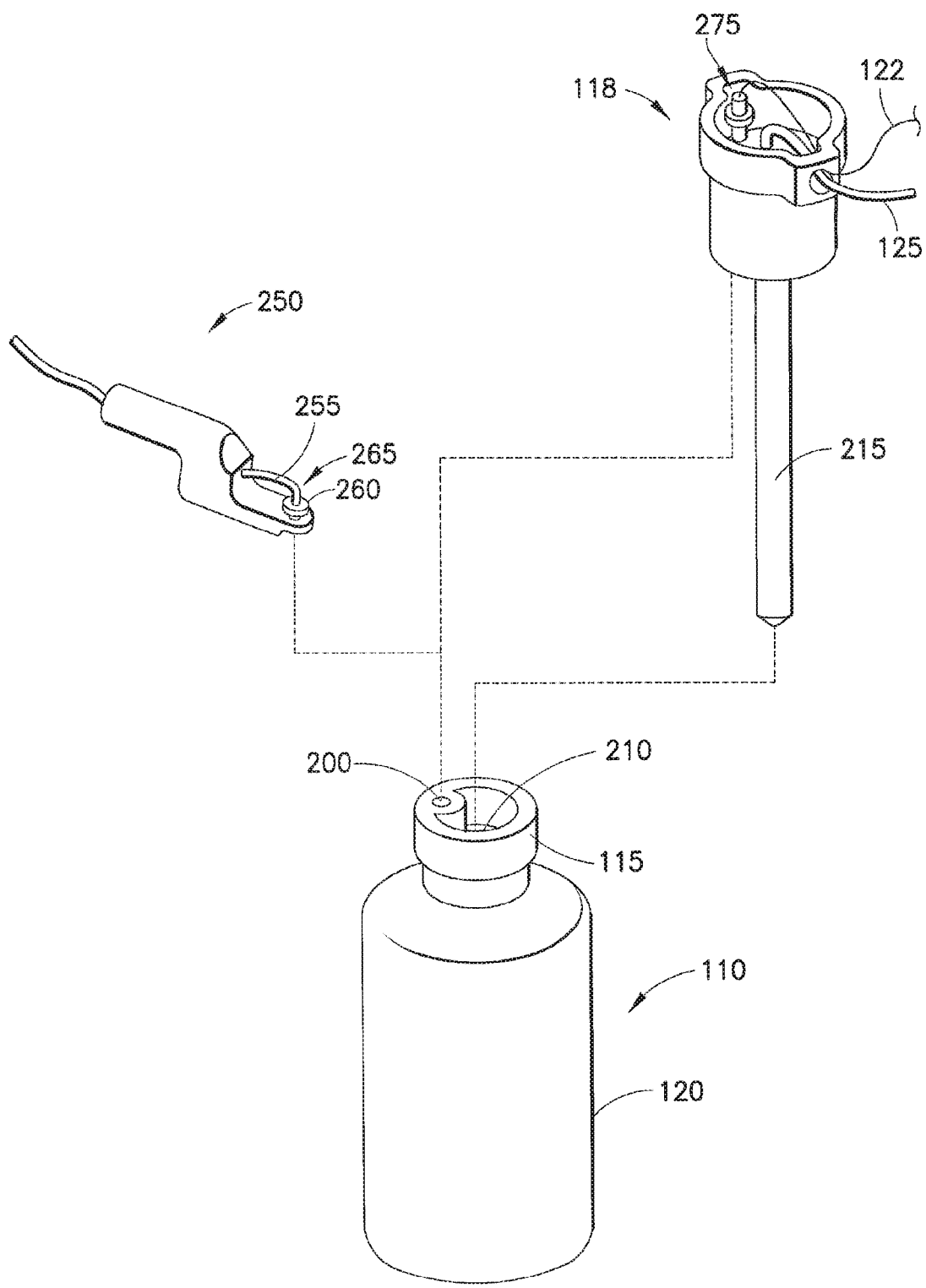
FIG. 6 is an exploded perspective view of an embodiment of a container assembly of the reader system of FIG. 5.

The container assembly 110 includes an information storing mechanism for storing information about a material contained therein, such as an information tag 200 (see FIG. 6). As shown in FIG. 5, a cap 115 is provided coupled to a container body 120. The information tag 200 is specifically located at the cap 115 in the embodiment shown. The cap 115 is configured to receive and secure a connector 118. The connector 118 in turn, is configured for simultaneously coupling the container assembly 110 to a process assembly 103 and a control unit 102 as described further below.

The container assembly 110 is configured to accommodate a material that is to be delivered to the process assembly 103. In the embodiment shown, the connector 118 is coupled to a process assembly 103 by way of a material line 125. Similarly, the connector 118 is coupled to the control unit 102. The control unit 102 is configured to identify and monitor the container assembly 110 as described further herein. An information cable 122 is provided for communication between the container assembly 110 and the control unit 102.

In the embodiment shown in FIG. 5, the control unit 102 includes a controller 150 directly coupled to the container assembly 110 and a touch screen monitor 140. The touch screen monitor 140 may display information directly related to the container assembly 110, or material therein, as described further herein. In addition to identifying and monitoring the container assembly 110, the control unit 102 may direct applications at the process assembly 103 which employ material contained by the container assembly 110.

Central processing capability is contained within the controller 150 and a controller cable 155 is provided to couple the process assembly 103 thereto. In this manner, applications employing material from a container assembly 110 may be directed by the control unit 102. For example, a user may direct such an application via the touch screen monitor 140. In certain embodiments, directing of such an application is based on information obtained from the information storing mechanism described above, and with reference to FIG. 6 below (see the information tag 200).

Continuing with reference to FIG. 5, the process assembly 103 includes a process chamber 175 coupled to a microprocessor 160. The microprocessor 160 may direct an application within the process chamber 175 based on a predetermined set of instructions or information from the controller 150. The process chamber 175 may contain a tool or equipment to employ material contained in the container assembly 110. For example, in one embodiment, the process chamber 175 includes a spin on tool 600 for application of a photoresist material 300 from the container assembly 110 to a semiconductor substrate 675 (see FIG. 10).

Referring now to FIG. 6, the container assembly 110 is shown in further detail. As described above, a connector 118 is coupled to the container assembly 110 at the cap 115. The cap 115 may include a rupturable membrane 210 to initially seal the contents of the container assembly 110. In such an embodiment, a probe 215 of the connector 118 may be used to penetrate the rupturable membrane 210 and provide communication between the material of the container assembly 110 and the connector 118. As described above, the connector 118 also includes an information cable 122 and a material line 125. The material line 125 couples to the probe 215 within the body of the connector 118. The information cable 122 terminates at an antenna assembly 275 described further below.

Figure 11:
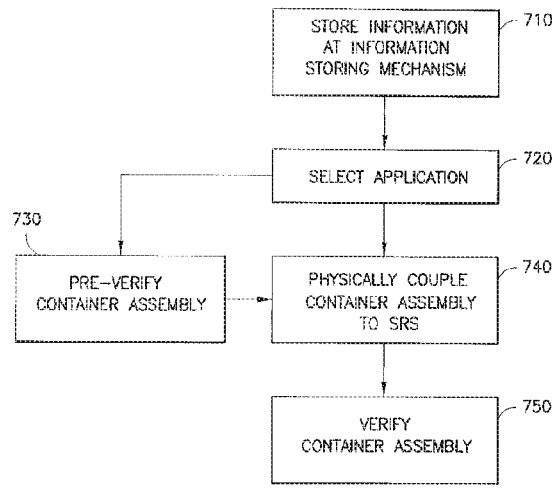
FIG. 11 is a flowchart summarizing methods of employing a reader system such as that of FIG. 5.
Figure 12:
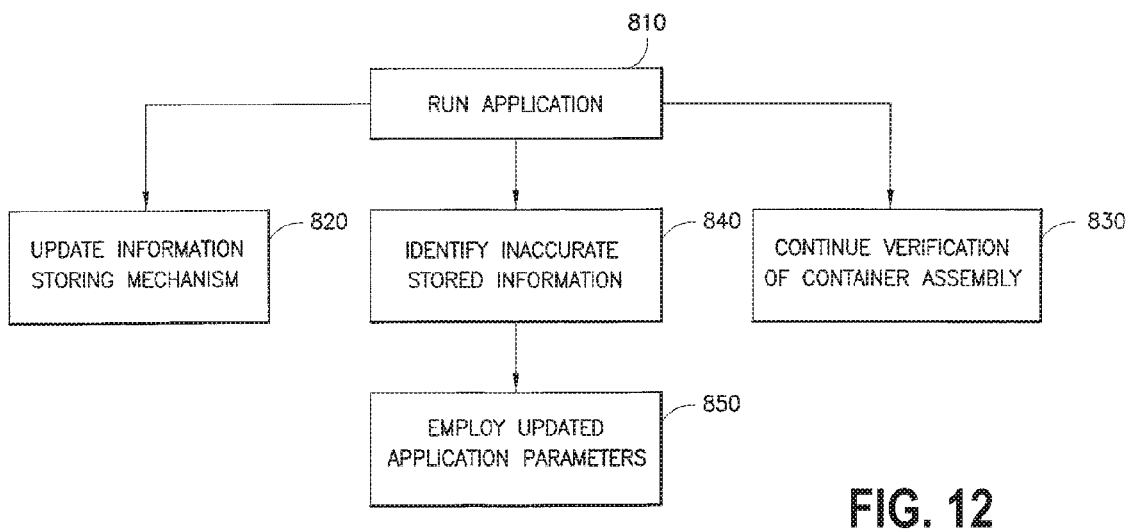
FIG. 12 is a flowchart summarizing additional methods of employing a reader system such as that of FIG. 5.

With additional reference to FIGS. 11 and 12, embodiments of employing an SRS 100 as shown in FIG. 5 are summarized in the form of flow-charts. FIGS. 11 and 12 are referenced throughout portions of the description to follow as an aid in describing how features of the SRS 100 may interact during use.

As also described above, the cap 115 of the container assembly 110 also includes an information tag 200 as the information storing mechanism. The information tag 200 is configured to hold data regarding the material contained by the container assembly 110. For example, in one embodiment, data regarding the material's properties, date and conditions of manufacture, amount, and other characteristics are stored at the information tag 200 (see 710 of FIG. 7).

The information tag 200 may be a bar code, magnetic strip, radio frequency identification (RFID) device employing electronically erasable programmable read only memory (EEPROM), or any other conventional mechanism suitable for storing information regarding material contained within the container assembly 110. In one embodiment, the information tag 200 includes EEPROM to increase the amount of data which may be stored at the information tag 200. In this embodiment, the data may be updated as indicated at 820 of FIG. 12, by writing to the information tag 200 as the material within the container assembly 110 changes (e.g. as the material amount decreases due to use in an application).

Figure 7:
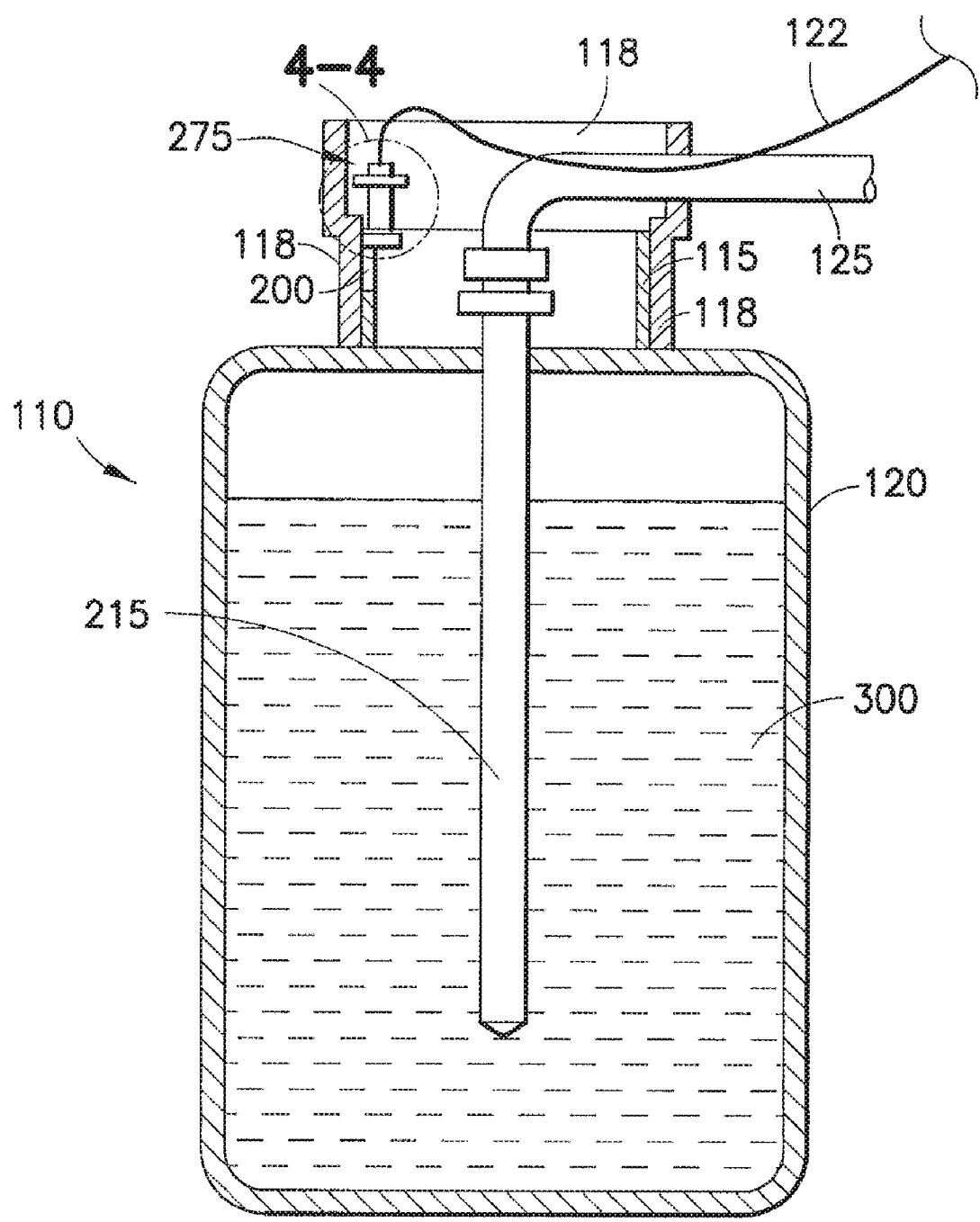
FIG. 7 is a cross-sectional view of the container assembly of FIG. 6.

Continuing with reference to FIGS. 6 and 7, the container assembly 110 may contain a photoresist material 300 for use in a particular application. The connector 118 includes features to ensure that the proper photoresist material 300 and container assembly 110 with proper photoresist material 300 is coupled to the connector 118 for use in the application.

The information cable 122 terminates at an antenna assembly 275 as noted. The connector 118 may be physically coupled to the cap 115, with the probe 215 in the container body 120 and antenna assembly 275 adjacent the information tag 200. Once positioned in this manner, the antenna assembly 275 may read information from the information tag 200 at the cap 115. In one embodiment, the antenna assembly 275 is prevented from reading information until the type of coupling described here, between the connector 118 and the cap 115, is employed. Information read by the antenna assembly 275 may be associated exclusively with the container assembly 110 due to the manner in which the connector 118 is physically secured and positioned at the container assembly 110. Thus, the connector 118 acts as a single pathway through which both material, in the container assembly 110, and information from the information tag 200, may pass.

To further ensure that the proper material and container assembly 110 are coupled to the connector 118 for a desired application, a verification tool 250 may be employed prior to coupling the connector 118 to the cap 115 of the container assembly 110. The verification tool 250 includes a verification cable 255 coupled to the controller 150 (see FIG. 5). The verification cable 255 terminates at a verification antenna 265 for reading information from the information tag 200. The verification antenna 265 includes a verification indicator 260, such as visible light emitting diodes (LEDs) or other suitable mechanisms.

With additional reference to FIG. 11, an application is selected at the control unit 102 (see FIG. 5). As indicated at 730, the verification antenna 265 of the verification tool 250 may be placed adjacent the information tag 200 and directed by the controller 150 (see FIG. 5) to read information from the information tag 200. The verification indicator 260 may then provide a visible response to the information read by the verification antenna 265. For example, in one embodiment, the verification indicator 260 may emit a green light when the information read from the information tag 200 indicates that an acceptable material 300 and container assembly 110 are present for a given application. Alternatively, the verification indicator 260 may emit a red light when the information from the information tag 200 indicates otherwise. In this manner, the photoresist material 300 and container assembly 110 may be verified before coupling of the connector 118 to the cap 115 of the container assembly 110.

Figure 9:
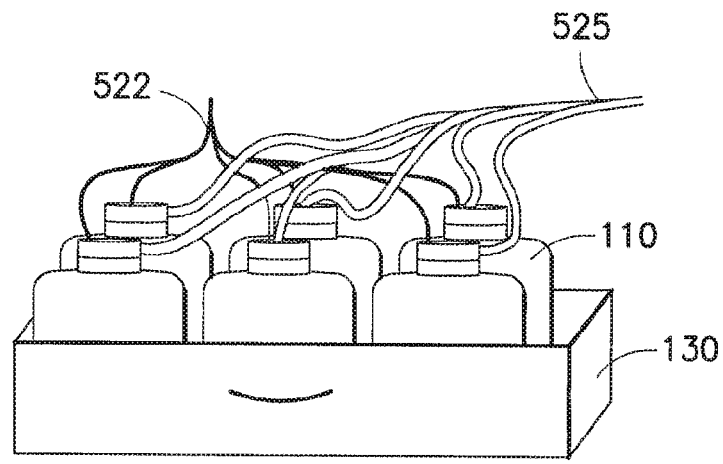
FIG. 9 is a perspective view of an embodiment of a cabinet drawer of the reader system of FIG. 5 and including a plurality of container assemblies.

In the embodiment shown, verification, as described above, prevents rupturing of the rupturable membrane 210 and exposure of the photoresist material 300 in order to verify the container assembly 110 and photoresist material 300 for use in a desired application. Additionally, the verification indicator 260 may elicit a visible response from the antenna assembly 275 as directed by the controller 150. This may include visible responses from multiple antenna assemblies 275 simultaneously, such as at a material drawer 130 as shown in FIG. 9.

With reference to FIG. 7, the container assembly 110 is physically secured to the SRS 100 of FIG. 5 as indicated at 740 (see FIG. 11). This is achieved through the coupling of the connector 118 to the cap 115. The probe 215 extends down into the container body 120 and into contact with the material. As shown, the connector 118 is properly secured to the container assembly 110 such that a fluid (e.g. photoresist material 300) may be drawn or pumped from the container body 120 through the probe 215 and into the material line 125 by conventional means.

The connector 118 is simultaneously secured to the cap 115 in a manner that also allows information from the information tag 200 to be read by the antenna assembly 275. The connector 118 is secured in this manner ensuring that it is ready to draw photoresist material 300 from the container assembly 110 at the same time the information may be transferred from the information tag 200 to the antenna assembly 275. This physically eliminates the possibility of the antenna assembly 275 reading information from any source other than the information tag 200 of the very container assembly 110 that is simultaneously in communication with the connector 118. For example, this prevents users from obtaining information from the information tag 200 of one usable container assembly 110 and photoresist material 300 only to later mistakenly couple a different unusable container to the connector 118 for an application.

Referring to FIG. 7, a container assembly 110 is shown with the connector 118 assembled thereto. The probe 215 extends into the container body 120 for withdrawal of photoresist material 300 to the material line 125 for use in an application. The probe 215 may extend vertically into the container body 120 as shown. Alternatively, the probe 215 may be configured of differing shapes or lengths to ensure that photoresist material 300 is drawn from the lowermost portion of the container body 120. When the connector 118 is secured as shown, at the cap 115, the antenna assembly 275 rests adjacent the information tag 200. Information may be exchanged between the information tag 200 and the antenna assembly 275 as described above, and transferred along the information cable 122. Thus, physical coupling of the proper container assembly 110 may be verified as indicated at 750 before an application is run as indicated at 810 (see FIGS. 11 and 12).

Figure 8:
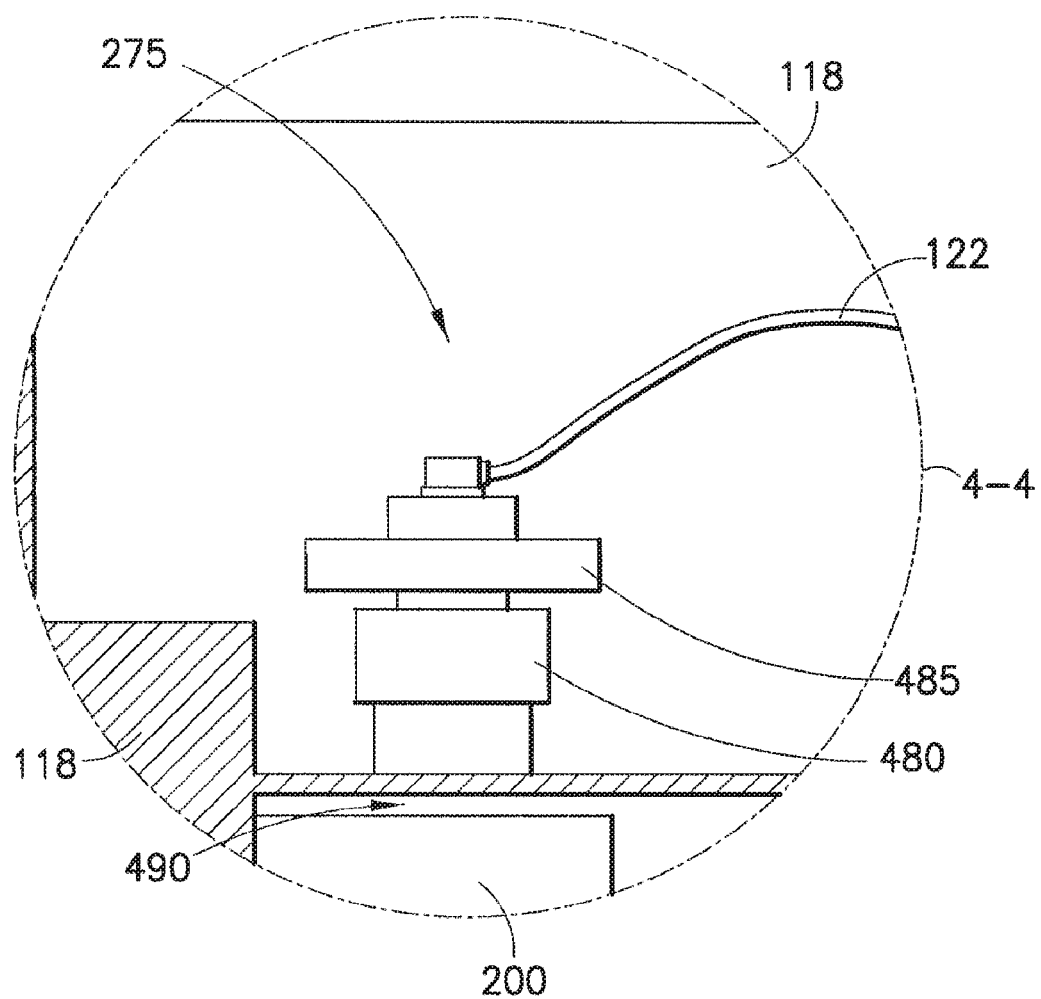
FIG. 8 is a magnified view of an antenna of the container assembly taken from section line 4-4 of FIG. 7.

With reference to FIGS. 7 and 8, the antenna assembly 275 is shown having an antenna portion 480 and an antenna indicator 485. The antenna portion 480 may be a conventional antenna to read information from the information tag 200. Physical coupling between the antenna portion 480 and the information tag 200 is not required. In the embodiment shown, a minimal clearance 490 is provided between the information tag 200 and the antenna portion 480 when the connector 118 is properly secured to the cap 115. A lack of physical contact between the information tag 200 and the antenna portion 480 helps preserve the integrity of the information tag 200 and the antenna portion 480.

The antenna portion 480 may serve to read information from the information tag 200. The antenna indicator 485 may include LED features configured to light up based on the information obtained from the information tag 200. For example, in one embodiment, the antenna indicator 485 may emit a green light when the information read from the information tag 200 indicates that an acceptable photoresist material 300 and container assembly 110 are present for a given application. Alternatively, the antenna indicator 485 may emit a red light when the information from the information tag 200 indicates otherwise. This may provide further assurance to the user that the proper container assembly 110 is being employed before an application is run making use of the photoresist material 300.

Continuing with reference to FIGS. 5-8, the exchange of information between the information tag 200 and the antenna assembly 275 may be directed by the controller 150. The controller 150 may also direct the application to be employed as described above. Therefore, in one embodiment, the determination of whether a particular container assembly 110 is acceptable for a particular application is based on a predetermined set of criteria stored in the controller 150. When an unacceptable container assembly 110 is coupled to the connector 118, the controller 150 may indicate such at the antenna indicator 485 as described above. Additionally, the controller 150 may respond by terminating the application before photoresist material 300 is drawn from the container body 120.

In addition to directing the application based on readings obtained from the information tag 200, the controller 150 may also direct that readings take place on a continuous or ongoing basis as indicated at 830 of FIG. 12. Ongoing readings may be used to prevent replacement of an acceptable container assembly 110 between applications without detection. In a preferred embodiment, readings take place in millisecond intervals. However, readings may also take place in alternate intervals. For example, in one embodiment, readings are obtained by the antenna portion 480 in intervals which are less than an estimated duration of the application. This ensures multiple readings by the antenna portion 480 before change out of the container assembly 110. Thus, even where an acceptable container assembly 110 is coupled to the connector 118 and an application immediately run, there is not enough time to subsequently couple an unacceptable container to the connector 118 without detection. In a further embodiment, the readings are obtained in intervals which are less than an estimated container change-out time (i.e. the time necessary to change out a container assembly 110). This ensures multiple readings by the antenna portion 480 before change out of the container assembly 110 even where no application has yet been run. For example, in an embodiment where change out of the container assembly 110 physically requires more than 5 seconds of the users time, readings may be taken in intervals of no more than about 5 seconds.

Continuing with reference to FIGS. 5-8, the antenna assembly 275 may be configured to write updated information to the information tag 200 as indicated at 820 of FIG. 12. For example, as noted above, the information tag 200 may include radio frequency identification (RFID) capacity. Therefore, information regarding the amount of material 300 in the container assembly 110 may be stored in the information tag 200. In one embodiment, as a quantity of material 300 is drawn from the container assembly 110 during an application, information regarding the amount of photoresist material 300 in the container assembly 110 may be updated. This updating is obtained by the antenna assembly 275 writing new information to the information tag 200 accounting for the quantity of photoresist material 300 drawn during the application. Therefore, up to date information regarding the amount of photoresist material 300 remains with the container assembly 110. Thus, the container assembly 110 may be removed from the SRS 100 or used with a different system without losing information regarding the amount of photoresist material 300 in the container assembly 110.

Referring to FIGS. 5 and 9, a container assembly 110 is shown in a material drawer 130 of the SRS 100. The material drawer 130 holds several such assemblies for use in a variety of possible applications to be directed by the controller. This user-friendly capacity also provides the SRS 100 with built in efficiency.

Figure 10:
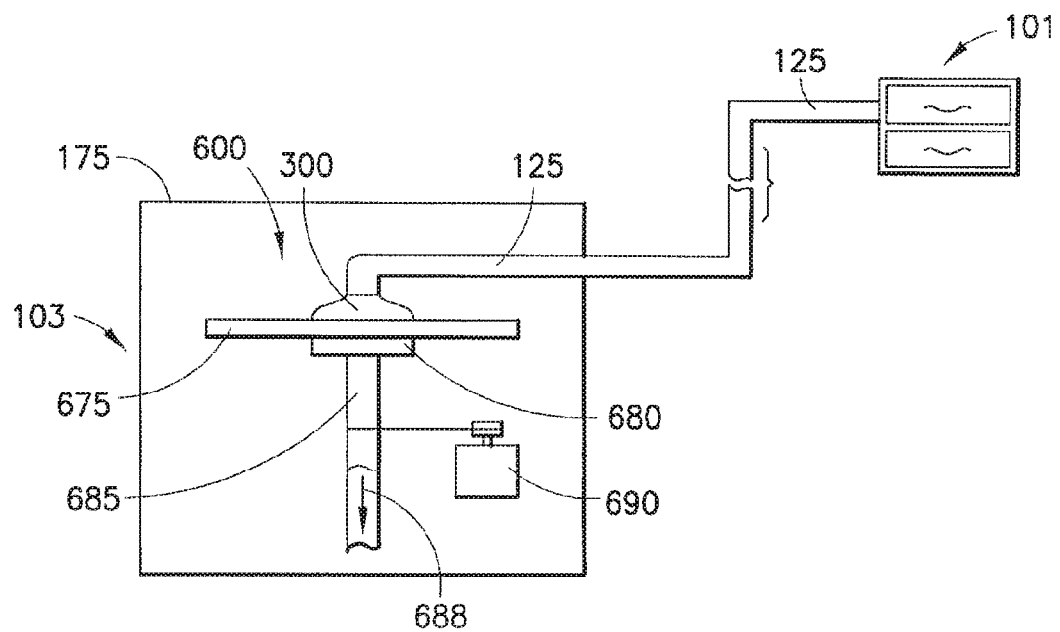
FIG. 10 is a sectional view of the process assembly of FIG. 5 revealing a spin-on tool.

Referring to FIG. 10, the process assembly 103 of FIG. 5 is shown in greater detail. In the embodiment shown, the process assembly 103 includes a process chamber 175 wherein a spin-on tool 600 is provided. The spin-on tool 600 is configured to receive and distribute photoresist material 300 across the surface of a semiconductor substrate 675. In other embodiments, the process chamber 175 may include tools for alternate techniques of distributing material, such as meniscus coating, stencil printing, or applications unrelated to photoresist distribution.

As shown in FIG. 10, a semiconductor substrate 675 is centrally positioned atop a rotatable platform 680 of the spin-on tool 600. The rotatable platform 680 is supported by a pipe 685 having a hallowed out portion 688 that terminates adjacent the semiconductor substrate 675. In this manner, a vacuum (shown by arrow 688) may be applied through the pipe 685 by conventional means to secure the semiconductor substrate 675 as shown.

With reference to FIGS. 5 and 10, a rotatable motor 690 is shown coupled to the pipe 685 for rotating the spin-on tool 600 as a photoresist material 300 is delivered to the surface of the semiconductor substrate 675. The photoresist material 300 is delivered from the material line 125 and cabinet 101 as directed by the controller 150. The controller 150 directs the described application through the microprocessor 160 according to functional properties of the photoresist material 300. Such functional property information is obtained from the container assembly 110 as described above.

In one embodiment, the photoresist material 300 is an i-line photoresist, such as a novolak resin and a phenolic compound in a propylene glycol monomethyl ether acetate (PGMEA) solvent. The phenolic compound may be a diazonaphtha quinone derivative. The controller 150, by way of the microprocessor 160, directs spinning of the spin-on tool 600 at between about 4,000 rpm and about 5,000 rpm as the photoresist material 300 is delivered. The semiconductor substrate 675 is then exposed to a temperature of between about 90° C. and about 100° C. for between about 25 seconds and about 35 seconds. A film of photoresist material 300 is thus provided on the semiconductor substrate 675. The resulting film may have a thickness of between about 1.0 microns and about 1.4 microns.

In other embodiments, similar but alternative parameters may be employed to provide alternate films of photoresist material 300 having different thicknesses. For example, in one embodiment a deep ultraviolet (UV) photoresist film may be provided having a thickness of between about 0.6 microns and about 1.0 microns. In another embodiment, a 193 nm photoresist, similar in character to a deep UV photoresist, may be provided having a thickness of between about 0.6 microns and about 0.8 microns.

The above described applications proceed based in part on information stored at the container assembly 110. However, in certain situations the information may not be entirely accurate. In the embodiments described here this may lead to the film thickness deviating from a desired range or other distribution problems. For example, there may be a change in viscosity from one batch or container of photoresist to the next that is unaccounted for at the time information is originally stored at the container assembly 110. As shown in FIG. 12, the presence of inaccurate information may be identified 840 by conventional means and the application revised to employ updated parameters 850. That is, parameters of the application may be changed by entering updated information through the control unit 102. In the embodiment shown, this requires only indicating the undesired film thickness obtained at the touch screen 140. Algorithmic adjustments accounting for the disparity may be made by the controller 150 and immediately applied to applications employing the photoresist material 300. The SRS 100 is configured in a manner that allows such seamless calibrations. This results in minimal down time and improved throughput when running such applications.

In yet another embodiment, information obtained from an information storing mechanism may be used dynamically. For example, in situations where material properties, such as viscosity, change over time, information stored at the information storing mechanism may relate to the age of the material or its viscosity at a given point in time. When running an application such information may be accounted for in an automated manner. For example, where the controller 150 has known viscosity rate change information stored therein (see FIG. 5), algorithmic values may be established automatically in a manner that accounts for the viscosity of the material at the precise time of the application.

Embodiments described above provide a secure manner of ensuring that a particular given material is exclusively made available for a given application. Embodiments are also described which provide a user-friendly and seamless manner of verifying and, if necessary, updating application parameters for which the material is to be employed.

While the above embodiments are described with reference to particular semiconductor photoresist applications other embodiments and features may be employed. For example, embodiments may be directed at spin on dielectric applications. Additionally, a system such as that described above may be configured for applications employing gas containers, blood bags, biopharmaceutical containers, drug delivery devices, and containers containing one of a variety of material types including returnable and reusable containers. A reusable container may even employ an information mechanism having new material information written thereon for each subsequent use of the container with new material therein. Embodiments described may be of particular benefit where material characteristics are prone to vary for example, from one container or batch to the next. Additionally, various other features and methods may be employed which are within the scope of the described embodiments.

While the invention has been has been described herein in reference to specific aspects, features and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Correspondingly, the invention as hereinafter claimed is intended to be broadly construed and interpreted, as including all such variations, modifications and alternative embodiments, within its spirit and scope.

What is claimed is:
1. A liquid handling system comprising:
a container having an interior adapted to hold a liquid and defining an opening;
a cap coupled to the container adjacent to the opening;

a connector adapted for physically coupling to the cap, the connector having an internal flow passage to permit extraction or dispensation of the liquid from the interior of the container;

an information storage element coupled with the container and adapted to store information relating to the liquid;

a communication element adapted to read information from the information storage element; and a control element, operably coupled with the communication element, for controlling processing of the liquid based on information read from the information storage element by the communication element.

2. The liquid handling system of claim 1, wherein the information storage element is disposed in or on said cap.

3. The liquid handling system of claim 1 wherein the information comprises any of: a property of said material, date of manufacture of said material, condition of manufacture of said material, and an amount of said material.

4. The liquid handling system of claim 1, wherein the connector is coupled to a process assembly to employ the material in an application.

5. The liquid handling system of claim 4, wherein the application is directed based on information obtained from the information storage element.

6. The liquid handling system of claim 1, wherein the information storage element comprises a bar code.

7. The liquid handling system of claim 1, wherein the information storage element comprises at least one of a magnetic storage element and a radio frequency identification device.

8. The liquid handling system of claim 1, wherein the information storage element comprises an electronic information storage element.

9. The liquid handling system of claim 1, wherein the communication element comprises an antenna.

10. The liquid handling system of claim 1, further comprising a rupturable membrane arranged to seal the interior and arranged for rupturing to allow the connector to access the interior, wherein the rupturable membrane is associated with the cap.

11. The liquid handling system of claim 1, wherein the connector comprises a probe defining the internal flow passage, and the probe is insertable into the interior of the container.

12. The liquid handling system of claim 1, further comprising a verification tool adapted to receive said information from the information storage element prior to coupling of said connector to said cap, wherein said information is used to dictate whether the connector should be coupled to said cap.

13. A liquid handling system comprising:

a container adapted to hold a liquid and defining a container opening;

a cap securable to the container proximate to the container opening, the cap (i) being arranged when secured to the container to seal the container for containment of liquid therein, and (ii) being adapted to engage a connector having a connector head defining a flow passage and adapted to extract liquid from the container when the connector is engaged to the cap; and an information storage element coupled with at least one of the container and the cap, and adapted to store information relating to the liquid.

14. The liquid handling system of claim 13, further comprising the connector.

15. The liquid handling system of claim 14, wherein the connector is coupled to a process assembly to employ the material in an application.

16. The liquid handling system of claim 15, wherein the application is directed based on information obtained from the information storage element.

17. The liquid handling system of claim 13, wherein the information storage element is coupled with the cap.

18. The liquid handling system of claim 13, wherein the information storage element comprises a bar code.

19. The liquid handling system of claim 13, wherein the information storage element comprises at least one of a magnetic storage element and a radio frequency identification device.

20. The liquid handling system of claim 13, wherein the information storage element comprises an electronic information storage element.

21. The liquid handling system of claim 13, further comprising an information exchange element adapted to store information to, and/or read information from, the information storage element.

22. A liquid handling system comprising:

a container adapted to hold a liquid and defining a container opening;

a sealing element disposed proximate to the container opening and arranged to seal liquid within the container;

a connector securable to a portion of the container along the opening, the connector having an internal flow passage to permit extraction or dispensation of the liquid from the interior of the container through the opening;

an information storage element associated with the container, and adapted to store information relating to the liquid; and a verification tool adapted to receive said information from the information storage element prior to securing of said connector to said portion of the container, wherein said information is used to dictate whether the connector should be coupled to said portion of the container.

23. The liquid handling system of claim 22, wherein the container comprises a cap as said portion of the container to which the connector is securable.

24. The liquid handling system of claim 23, wherein the sealing element comprises said cap.

25. The liquid handling system of claim 22, wherein the information storage element is disposed in or on said cap.

26. The liquid handling system of claim 22 wherein the information comprises any of: a property of said material, date of manufacture of said material, condition of manufacture of said material, and an amount of said material.

27. The liquid handling system of claim 22, wherein the connector is coupled to a process assembly to employ the material in an application.

28. The liquid handling system of claim 27, wherein the application is directed based on information obtained from the information storage element.

29. The liquid handling system of claim 22, wherein the information storage element comprises a bar code.

30. The liquid handling system of claim 22, wherein the information storage element comprises at least one of a magnetic storage element and a radio frequency identification device.

31. The liquid handling system of claim 22, wherein the information storage element comprises an electronic information storage element.

32. The liquid handling system of claim 22, further comprising an information exchange element adapted to store information to, and/or read information from, the information storage element.

* * * * *

UNITED STATES PATENT AND TRADEMARK OFFICE
CERTIFICATE OF CORRECTION

PATENT NO.       : 8,150,549 B2                                    Page 1 of 1
APPLICATION NO.  : 12/707449
DATED            : April 3, 2012
INVENTOR(S)      : Kevin T. O'Dougherty It is certified that error appears in the above-identified patent and that said Letters Patent is hereby corrected as shown below:

Title Page, Item (63) "Related U.S. Application Data",

"Continuation of application No. 10/742,125, filed on Dec. 19, 2003, now Pat. No. 7,702,418, which is a continuation-in-part of application No. 09/880,472, filed on Jun. 13, 2001, now Pat. No. 6,879,876, application No. 12/707,449, which is a continuation of application No. 10/139,104, filed on May 3, 2002, now Pat. No. 7,747,344, which is a continuation-in-part of application No. 09/880,472."

should be

--Continuation of application No. 10/742,125, filed on Dec. 19, 2003, now Pat. No. 7,702,418, which is a continuation-in-part of application No. 09/880,472, filed on Jun. 13, 2001, now Pat. No. 6,879,876. The application is also a continuation of application No. 10/139,104, filed on May 3, 2002, now Pat. No. 7,747,344, which is a continuation-in-part of application No. 09/880,472.--

Signed and Sealed this
Sixth Day of November, 2012

David J. Kappos
*Director of the United States Patent and Trademark Office*